United States Patent [19]

Chen et al.

[11] Patent Number: 4,704,628

[45] Date of Patent: Nov. 3, 1987

[54] COMBINED INTRAFRAME AND INTERFRAME TRANSFORM CODING SYSTEM

[75] Inventors: Wen-hsiung Chen, Sunnyvale; James P. Elliott, Cupertino; Robert E. G. Newell, San Jose; Ralph E. Nichols, Los Gatos; Albert E. Rackett, Sunnyvale, all of Calif.

[73] Assignee: Compression Labs, Inc., San Jose, Calif.

[21] Appl. No.: 886,634

[22] Filed: Jul. 16, 1986

[51] Int. Cl.$^4$ .................. H04N 7/12; H04N 7/133; H04N 7/137

[52] U.S. Cl. .................. 358/136; 358/133; 358/135; 375/27

[58] Field of Search .................. 358/136, 135, 133; 375/27

[56] References Cited

U.S. PATENT DOCUMENTS

| | | | |
|---|---|---|---|
| 4,245,248 | 1/1981 | Netravali | 358/136 |
| 4,281,344 | 7/1981 | Mounts | 358/136 |
| 4,302,775 | 11/1981 | Widergren | 358/136 |

FOREIGN PATENT DOCUMENTS

0197527 10/1986 European Pat. Off. .
2173067 10/1986 United Kingdom .

Primary Examiner—Howard W. Britton
Attorney, Agent, or Firm—Fliesler, Dubb, Meyer & Lovejoy

[57] ABSTRACT

An apparatus and method for signal processing employing intraframe and interframe variable prediction transform coding. Images are represented by sequential frames of two-dimensional arrays of digital signals. The digital signals are transformed to form transform coefficients for each frame. Predicted transform coefficients are formed using sets of variable prediction factors. The predicted transform coefficients for each frame are compared with corresponding actual transform coefficients for the frame to form transform coefficient difference signals. The difference signals are processed to control their range of values. The processed difference signals are statistically coded such that the more frequently occurring values are represented by shorter code lengths and the less frequently occurring values are represented by longer code lengths. The coded signals are stored in a buffer memory for transmission.

39 Claims, 18 Drawing Figures

COMBINED INTRAFRAME AND INTERFRAME TRANSFORM CODING SYSTEM

BACKGROUND OF THE INVENTION

The present invention relates to methods and apparatus for processing image signals to remove redundant information thereby making the signals more suitable for transfer through a limited-bandwidth medium. The present invention specifically relates to methods and apparatus for use in video compression systems.

Many signal processing techniques useful in video compression systems are known. For example, digital encoding is often employed in processing television signals which are to be transferred over transmission channels since digital data streams are more immune to noise degradation.

In order to digitally encode a television signal, a significant number of bits, 4 or more, may be required to provide for an acceptable range of gray scale for each of the hundreds of thousands of separate picture elements (pixels) which form an image. Consequently, data rates for unprocessed digitalized television signals typically require a bandwidth greater than 40 megabits per second. If the communications link is an earth satellite, an unprocessed video signal typically occupies nearly the entire bandwidth of the satellite, with very few channels, if any, left over for other uses. A T1 communication channel is typical and has only a 1.5 megabit per second bandwidth. A practical yet effective way to reduce the bandwidth of digitalized television signals is needed so that fewer channels are required for transmission over a communications path and so that the quality of transmitted signals is maintained even when reduced bandwidth transmission is employed.

U.S. Pat. No. 4,302,775, assigned to the same assignee as the present invention, describes an improved scene adaptive coding technique which eliminates redundant information and thereby reduces the bandwidth.

The patent describes a single-pass digital video compression system which implements a two-dimensional cosine transform with intraframe block-to-block comparisons of transform coefficients without need for preliminary statistical matching or preprocessing.

Each frame of the video image is divided into a predetermined matrix of spatial subframes or blocks. The system performs a spatial domain to transform domain transformation of the picture elements of each block to provide transform coefficients for each block. The system adaptively normalizes the transform coefficients so that the system generates data at a rate determined adaptively as a function of the fullness of a transmitter buffer. The transform coefficient data thus produced is encoded in accordance with amplitude Huffman codes and zero-coefficient run length Huffman codes which are stored asynchronously in the transmitter buffer. The encoded data is output from the buffer at a synchronous rate for transmission through a limited-bandwidth medium. The system determines the buffer fullness and adaptively controls the rate at which data is generated so that the buffer is never completely emptied and never completely filled.

In the system receiver, the transmitted data is stored in a receiver buffer at the synchronous data rate of the limited-bandwidth medium. The data is then output from the receiver buffer asynchronously and is decoded in accordance with an inverse of the encoding in the transmitter. The decoded data is inversely normalized and inversely transformed to provide a representation of the original video image.

The U.S. Pat. No. 4,302,775 reduces redundancy by employing intraframe coding techniques utilizing intraframe comparisons of cosine transform coefficients. While the patent provides significant improvement over other techniques, there is a need for even greater compression.

In addition to intraframe coding techniques, interframe coding techniques have been used to reduce the rate required for video transmission. Typically, each video frame is held in memory at both the transmitter and the receiver and only frame-to-frame changes are transmitted over the communication link. In contrast to intraframe coding schemes in which the quality of coded images is dependent upon the amount of detail in each single image frame, the quality of the coded image in interframe coding is dependent upon the differences from frame to frame. Frame-to-frame differences are often referred to as "motion".

Interframe coding techniques are broadly classified into two categories, namely, spatial domain coding and transform domain coding. In one real-time interframe spatial-domain coding system, spatial domain data is threshold processed to obtain and store frame difference signals in a transmitter buffer. The threshold value is adaptively determined as a function of the transmitter buffer fullness. That system has not been entirely satisfactory because a wide range of threshold values is employed and results in a displeasing breakdown of the reconstructed image. In order to eliminate the image breakdown, both spatial and temporal subsampling has been proposed. Although these proposals have resulted in some improvement, they have not provided a system with fully satisfactory compression.

Interframe coding using transform domain coding has not been widely employed. In most proposed systems, the high cost of implementing a real-time spatial-to-transform domain transformer has made transform domain coding seem impractical. Nonetheless, several interframe transform coding systems have been proposed.

A conditional replenishment transform video compressor is described by Harry W. Jones, Jr. in the article "A CONDITIONAL REPLENISHMENT HADAMARD VIDEO COMPRESSOR", SPIE Vol. 119, Application of Digital Image Processing, (IOCC 1977), pp. 91–98. In that system, the transform coefficients for one frame are stored and compared with the transform coefficients for a subsequent frame. If the frame-to-frame threshold coefficient difference exceeds a threshold, the picture image or subimage is considered to have changed. The coefficient differences are measured relative to preselected vectors of the array of transform coefficients.

Another interframe transform coding system is described by J. A. Roese, W. K. Pratt, and G. S. Robinson, in an article entitled "Interframe Cosine Transform Image Coding", IEEE Transactions on Communications, COM 25, Nov. 11, 1977, pp. 1329–1339. In that system, frame-to-frame differences are employed as part of a differential pulse code modulation predictive coding technique. The transform coefficients are predicted using a fixed, first-order linear prediction function.

Another transform domain coding system is described by David N. Hein and Harry W. Jones, Jr., in an article entitled "Conditional replenishment using motion prediction", SPIE Vol. 207, Applications of Digital Image Processing III, (1979), pp. 268–277. That system detects and sends only the changed portions of the image. The receiver uses the data from the previous frame for the non-changed portion. Such systems are known as conditional replenishment systems, since only the changed data is sent (replenished). In the Jones system, the frame-to-frame difference analysis to determine change is carried on in the spatial domain. The conditional replenishment technique of Jones does not achieve fully satisfactory data compression.

While many different signal processing systems have been proposed, including those described above, none of them have provided fully satisfactory and sufficient data compression.

Accordingly, there is a need for improved signal processing methods and apparatus for data compression systems.

SUMMARY OF THE INVENTION

The present invention is a method and apparatus for signal processing employing intraframe and interframe variable prediction transform coding. Images are represented by sequential frames of two-dimensional arrays of digital signals. The digital signals are transformed to form transform coefficients for each frame. Predicted transform coefficients are formed using sets of variable prediction factors. The predicted transform coefficients for each frame are compared with corresponding actual transform coefficients for the frame to form transform coefficient difference signals. The difference signals are processed to control their range of values. The processed difference signals are statistically coded such that the more frequently occurring values are represented by shorter code lengths and the less frequently occurring values are represented by longer code lengths. The coded signals are stored in a buffer memory for transmission.

The coded signals in the buffer memory are transmitted, over a limited-bandwidth medium, to the receiver along with processing information. The processing information includes codes identifying the set of variable prediction factors utilized in the transmitter. The same set of variable prediction factors is utilized in the receiver to reconstruct predicted transform coefficients which in turn are used to reconstruct representations of the original images in the transmitter.

The present invention employs variable prediction factors because the correlation of corresponding transform coefficient from frame to frame, in general, is variable and non-linear. For typical images, the correlation of low frequency coefficients is greater than the correlation for high frequency coefficients. The prediction factors are selected to vary in the manner that the transform coefficients are expected to vary. Different sets of prediction factors are selected as a function of frame-to-frame differences in image data.

The present invention eliminates redundant data in the intraframe spatial domain and in the interframe time domain and thereby achieves a significant reduction in the amount of data to be coded and transmitted.

The data used for prediction of coefficients is totally historical so that both the transmitter and the receiver can predict identical transform coefficients. The data coded is derived from the differences between the amplitudes of the actual coefficients and the predicted coefficients. The variance of the difference data is, in general, much less than the variance of the coefficients themselves.

When the coefficients from frame to frame are highly correlated, that is the difference from frame to frame are small, only small amounts of data representing the differences are coded and transmitted. However, when the correlation is low or entirely absent, then the coefficients themselves are coded and transmitted rather than the differences.

The scene adaptive coding of frame-to-frame coefficient differences using variable prediction of the present invention achieves the objective of providing an improved signal processing system which is capable of reducing the bandwidth required in order to transmit high quality images.

Additional objects and features of the present invention will appear from the following description in which the preferred embodiments of the invention have been set forth in conjunction with the drawings.

DETAILED DESCRIPTION

Summary

Figure 1:
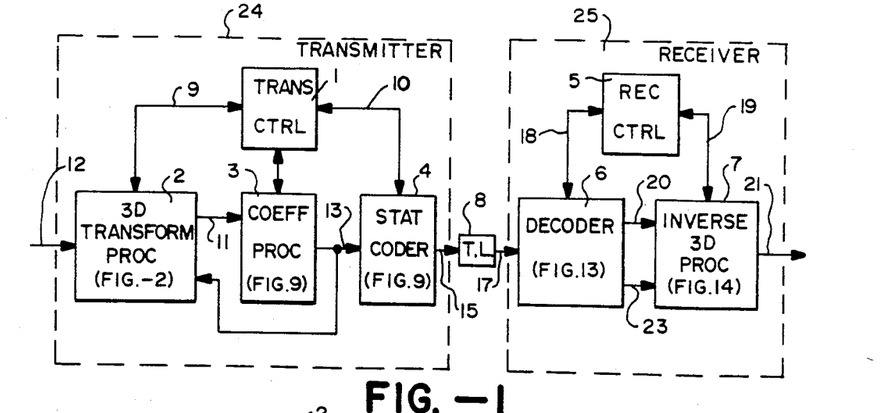
FIG. 1 depicts an image processing system, including a transmitter and receiver connected by a transmission line, which employs the transform coding of the present invention.

In FIG. 1, digital signals representing images to be processed and transmitted to a receiver appear on the input bus 12. The system of FIG. 1 is typically a video compression system. The transmitter 24 processes the digital image signals on bus 12 and provides transmission signals on bus 15. The processing carried out by transmitter 24 includes combined intraframe and interframe scene adaptive coding. The signals on bus 15 are transmitted over a transmission bus 8, or other transmission medium, to a receiver 25. Receiver 25 receives the transmitted signals on bus 17 and inverse processes the received signals to reconstruct digital image signals on output bus 21. The signals on bus 21 are the reconstituted signals representing the digital input signals on bus 12.

Each block of a digital image is represented by a two-dimensional array of transform coefficients. In general, the correlation of the corresponding coefficients in corresponding blocks from frame to frame is variable and non-linear. When the coefficients from frame to frame are highly correlated, that is the differences from frame to frame are small, only a small amount of data representing the difference between predicted and actual values is transmitted. The minimum mean square difference is achieved when the predictor, P, used for forming the predicted value has the form, $$P = k \ (amplitude) + (1-k) \ (mean \ amplitude),$$

where k is proportional to correlation.

Since the mean value of all coefficients is zero, the second term in the above equation can be dropped. The coefficient k is known as the "leakage factor" or prediction factor, since for any value less than unity, a portion of the transmitted data represents absolute amplitude information and any spurious error will be incrementally removed, or "leaked away" in subsequent frames.

In the absence of noise and any frame-to-frame difference, frame-to-frame correlation is uniformly unity for all coefficients. Under usual conditions, however, noise-free operation cannot be achieved. In practical environments, a large portion of the coefficient set, even from otherwise identical frames, will exhibit some small difference. At the low frequency end of the spectrum, correlation tends to be high even in blocks representing large frame-to-frame differences so that the assigned prediction factor will be close to or equal to unity in such cases. The assigned prediction factor varies over the intermediate frequency regions according to the magnitude of frame-to-frame differences.

The variable prediction factors are selected as a function of frame-to-frame differences in the image data. The accumulated sum of the transformed image data differences over a block are accumulated to form a measure of the magnitude of the data correlation within the block. If the accumulated count is high, indicating a low correlation, then one set of prediction factors is employed. If the accumulated count is low, indicating that the correlation of the blocks from frame-to-frame is high, then another set of prediction factors is selected. The magnitude of the accumulated count is used to select which set of prediction factors is to be used. Each coefficient within the block is associated with a difference prediction factor from the selected set of factors. The range of the prediction factors in each set is between unity and zero. In general, the prediction factors for any particular set varies nonlinearly from coefficient to coefficient.

In one embodiment, the selection of a set of prediction factors is determined by an analysis of the differences between untransformed 2-dimensional spatial digital signals within corresponding blocks in sequential frames.

In another embodiment, the selection of a set of prediction factors is determined by an analysis of frame-to-frame transform coefficient differences.

The sets of prediction factors are stored in a prediction table. In a preferred embodiment, the prediction factors are not utilized as a means of regulating data rate, but as a means of optimizing the reduction in data required to represent various blocks whose statistics vary with the amount of frame-to-frame difference.

In a preferred embodiment, rate regulation is accomplished primarily by means of thresholding and normalization. In the thresholding process, coefficients having an amplitude below a predetermined threshold are treated as being the least significant data and therefore, the data which can most readily not be transmitted.

In a typical system to be described, the transform coefficients are represented by 12-bit words. With twelve-bit words, eight quantization levels are utilized thus allowing accurate regulation of the number of coefficients deleted by the threshold process.

The transmitter functions to process the image data in the same manner as the image data will be by the receiver. This duplication is carried out in the transmitter so that the transmitter can form an accurate difference signal for predicting data for subsequent frames.

Transmitter/Receiver System—FIG. 1

In FIG. 1, the 3D transform processor 2 carries out a three dimensional data mapping to generate coefficients representing the digital image provided on input bus 12. The 3D transform carried out by processor 2 includes a 2D transform. The 2D transformation is typically a cosine transform like that described in U.S. Pat. No. 4,302,775. Additionally, the 3D transform processor 2 generates $3^{rd}D$ coefficients as a result of frame-to-frame correlation.

The transform coefficients generated by the 3D transform processor 2 are further processed by the coefficient processor 3. The coefficients are processed by thresholding and normalization. The processing is controlled by the transmitter control 1 in response to the data rates in the statistical coder 4 relative to the average or constant data rate over the transmission bus 8.

The statistical coder 4 statistically codes the signals from the coefficient processor 3 in a manner which minimizes the number of data bits required. This coding is achieved by assigning codes having fewer numbers of bits to data values having higher frequencies of occurence and assigning codes having greater numbers of bits to data values having lower frequencies of occurrence.

With these operations in the transmitter 24, the transmitter tends to optimize the data rate on bus 15 whereby the highest quality image is transmitted for the available bandwidth of the transmission bus 8.

The transmitter 24 performs interframe scene adaptive coding in a manner similar to the intraframe scene adaptive coding of U.S. Pat. No. 4,302,775. Further details of statistical coding techniques and scene adaptive coding are available in that patent and can be utilized in the present system.

In FIG. 1, the receiver in decoder 6 decodes the received transmission signal on bus 17 to provide the received signal on bus 20. The received signal on line 20 is connected as an input to the inverse 3D processor 7 which generates the digital image signals on bus 21. The signals on bus 21 are a reconstituted representation of the digital image signals on input bus 12.

Figure 2:
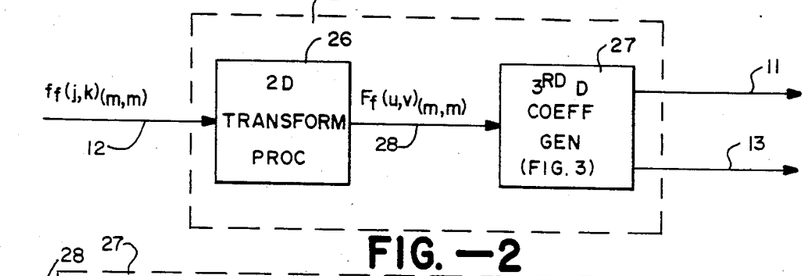
FIG. 2 depicts a block diagram of the three-dimensional transform processor utilized in the transmitter of the FIG. 1 system.

3D Transform Processor—FIG. 2

In FIG. 2, the 3D transform processor 2 within the transmitter 24 of FIG. 1 is shown in further detail. The processor 2 includes a 2D transform processor 26 connected via bus 28 to a $3^{rd}$D coefficient generator 27. In one embodiment, the 2D transform processor 26 is a cosine transform device like device 18 in the above-referenced U.S. Pat. No. 4,302,775.

Typically, the input signal for each pixel of a digital image on bus 12 of FIG. 1 is designated as $f_f(j,k)_{(m,n)}$. With this input, the output from the 2D transform processor 26 is the cosine transform coefficients designated as $F_f(u,v)_{(m,n)}$. The subscripts m and n indicate the row and column locations of a block in a particular frame and the subscript f indicates the frame number. The variables j and k designate the row and column location of the spatial domain pixel within a block. The variables u and v are the transform variables resulting from the cosine transform or the block of pixels in the J-by-K matrix of pixels in the block.

Figure 16:
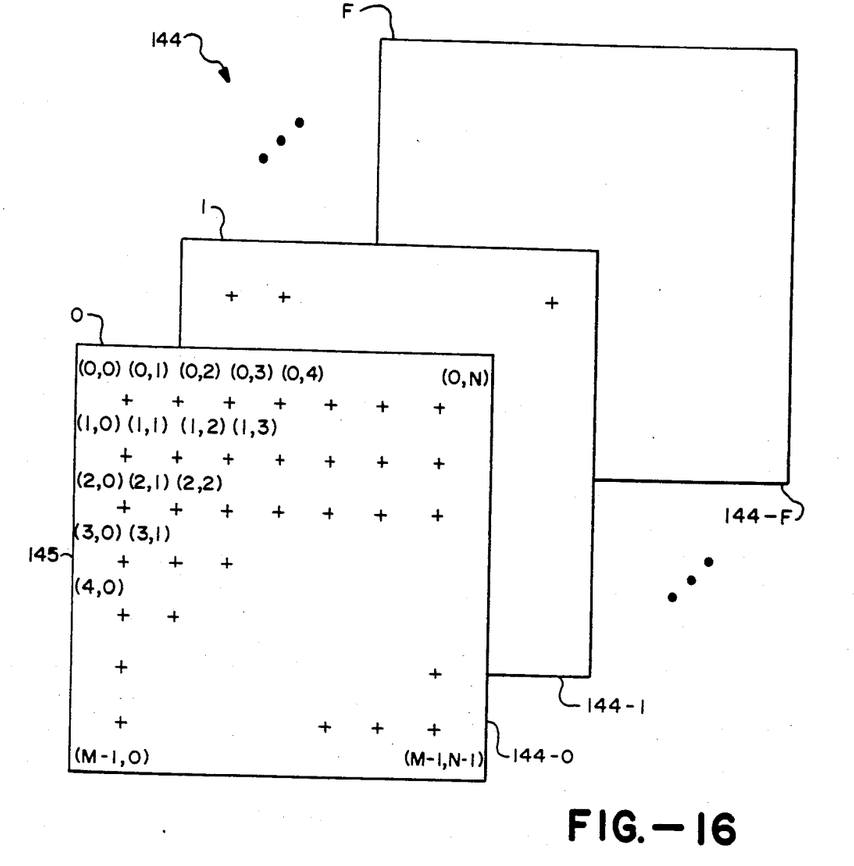
FIG. 16 depicts a representation of a plurality of digital image frames 0,1, ..., f and their organization into blocks.

Referring to FIG. 16, a plurality of frames 144 identified as the frame 0,1,2, ..., F are shown. Each of the frames represents an image such as a television display or a picture. Each of the frames 144 in turn is organized into a matrix of blocks in rows 0,1, ..., (m−1) and in columns 0,1,2, ..., (N−1). In a typical example, each frame has 32 rows and 32 columns so that the maximum value of M and the maximum value of N are each equal to 32.

Figure 17:
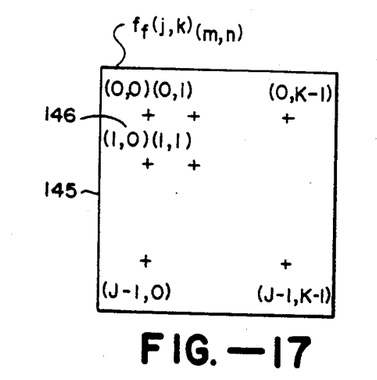
FIG. 17 depicts a schematic representation of the transformation of spatial image signals to 2D transform image signals for each of the blocks within the FIG. 16 frames.

In FIG. 17, a typical one of the blocks 145 having block coordinates (2,0) is shown in expanded detail. The block 145 in FIG. 17 is composed of a J-by-K matrix of pixels 146. In a typical example, the matrix is a 16-by-16 array of pixels so that the maximum value of both J and K equals 16.

During the processing of data, each pixel, such as the (1,0) pixel 146 in FIG. 17, has an amplitude which is typically represented by an 8-bit number. The 8-bit numbers representing the amplitudes of pixels appear on the input bus 12 one at a time at the sampling frequency, CLK. For 256-pixel blocks, all 256 of the 8-bit digital numbers for one block are input to the 2D transform processor 26 of FIG. 2.

The amplitude of each signal on input bus 12 for the $(j,k)^{th}$ pixel, the $(m,n)^{th}$ block, and the $f^{th}$ frame is designated as $f_f(j,k)_{(m,n)}$.

For each block of pixel amplitudes, as represented by FIG. 17, the 2D transform processor 26 of FIG. 2 provides a cosine transform to form, the the $(m,n)^{th}$ block of image signals in the $f^{th}$ frame, the transform coefficients designated as $F_f(u,v)_{(m,n)}$.

where, u=cosine transform row coordinate
v=cosine transform column coordinate.

The cosine transform of the two-dimensional image array of image signals $f_f(j,k)_{(m,n)}$ when j,k=0,1, ..., N−1, appear on bus 28 of FIG. 2 and are given as follows:

$$F_f(u,v)_{(m,n)} = [[4C(u,v)]/N^2] \sum_{j=0}^{N-1} \sum_{k=0}^{N-1} [f_f(j,k)_{(m,n)} \cos[(2j+1)u\pi/2N] \cos[(2k+1)v\pi/2N]]$$

for u, v=0,1, ..., N−1, where
$C(u,v) = \frac{1}{2}$, for (u,v)=0
$C(u,v) = 1$, for (u,v)≠0

The order in which blocks in each of the frames 144 of FIG. 16 are processed and appear on bus 28 are typically the row m and the column n order. In the example described, M and N are each 32 so that there are 1024 blocks which are uniquely identified by a 10-bit count designated as the count, b. The 10-bit count is conveniently segregated into a 5-bit count which represents the row number m and into second 5-bit count which represents the column number n. Each time a different column in the same row is processed, the column count is incremented. After a complete row of columns is processed, the row count is incremented and all of the columns in the next row are processed.

The processing of the transform coefficients $F_f(u,v)_{(m,n)}$ does not proceed in the row and column order of the u-by-v matrix but, in a preferred embodiment, proceeds along the diagonals of the matrix.

In accordance with the diagonal processing, the coordinates (u,v) are scanned in the order (0,0), (0,1), (1,0), (2,0), (1,1), (0,2), (0,3), ..., (255,254), (255,255). That order of processing row and column coordinates (u,v) is represented by the sequence of c numbers, where c is equal to 0,1,2, ..., 255, respectively. The relationship between the c numbering and (u,v) numbering is shown in the following TABLE I.

TABLE I

| c | (u,v) | |
|---|---|---|
| 0, | (0,0) | |
| 1,2, | (0,1),(1,0), | |
| 3,4,5, | (2,0),(1,1),(0,2), | |
| 6, ... ,9, | (0,3),(1,2),(2,1),(3,0), | |
| 10, ... ,14, | (4,0),(3,1),(2,2),(1,3),(0,4), | |
| 15, ... ,20, | (0,5),(1,4), ... ,(4,1),(5,0), | |
| . | . | |
| . | . | |
| . | . | |
|  | (0,13),(1,12), ... | ,(0,14), |
|  | (14,0),(13,1), ... | ,(14,1),(15,0), |
|  | (0,15),(1,14), ... | ,(2,14),(1,15), |
|  | (15,1),(14,2), ... | |
| . | . | |
| . | . | |
| 246, ... ,249, | (12,15),(13,14),(14,13),(15,12), | |
| 250,251,252, | (15,13),(14,14),(13,15), | |
| 253,254, | (14,15),(15,14), | |
| 255 | (15,15) | |

Figure 18:
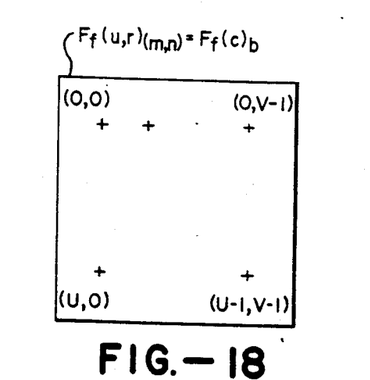
FIG. 18 depicts a schematic representation of the cosine transform coefficients for the $f^{th}$ frame and the $b^{th}$ block.

The cosine coefficients on bus 28 from processor 26 represented in FIG. 18 are processed in the $3^{rd}$D coefficient generator 27 in order to remove redundant information. In general, the coefficients for a particular frame f are compared with the coefficients for the previous frame f−1. The output on bus 11 is the difference signal, $e_f(u,v)_{[m,n-1]}$ which represents the difference between the coefficients in the $f^{th}$ frame and the predicted coefficients for the $f^{th}$ frame for the block [m,n−1]. The predicted coefficients are determined as a function of the correlation of corresponding blocks of the $f^{th}$ and $(f-1)^{th}$ frames. When the coefficient variables (u,v) are reordered as c and using b to represent (m,n), the difference signal $e_f(u,v)$ $_{[m,n-1]}$ becomes $e_f(c)$ $_{(b-1)}$.

Differential Pulse Code Modulation (DPCM) is a predictive coding technique in which the difference $e_f(u,v)$, between the current coefficient $F_f(u,v)$ and an estimate of the coefficient $F_f^p$ (u,v) is given as follows $$e_f(u,v) = F_f(u,v) - F_f^p(u,v).$$

The estimation of the coefficient is based upon frame-to-frame correlations between the present frame and the previous frame. The coefficient for the present frame is defined in terms of the previous frame as follows:

$$F_f(u,v) = a(u,v) F_{f-1}(u,v)$$

The term a(u,v) in above equation is defined as the prediction factor which is given as follows:

$$a(u,v) = \rho(u,v)/[\sigma^2(u,v)]$$

where $\rho(u,v)$ is the covariance of $F_f(u,v)$ and $F_{f-1}(u,v)$, and $\sigma^2(u,v)$ is the variance of $F_f(u,v)$ with $F_{f-1}(u,v)$, assumed to be stationary. Both the receiver and transmitter make the same estimation of the coefficient value so that the receiver can reconstruct the coefficient from the transmitted signal.

The signal fed back to processor 2 on bus 13 are the threshold selected and normalized difference signals developed by the coefficient processor 3 of FIG. 1. In the $3^{rd}D$ coefficient generator 27, the feedback signal on bus 13 undergoes inverse normalization and threshold adding for use in providing the predicted value of the transform coefficients. The predicted coefficient values are used for comparison in forming the next difference signal on bus 11. Further details of the $3^{rd}D$ coefficient generator 27 are shown in FIG. 3.

Figure 3:
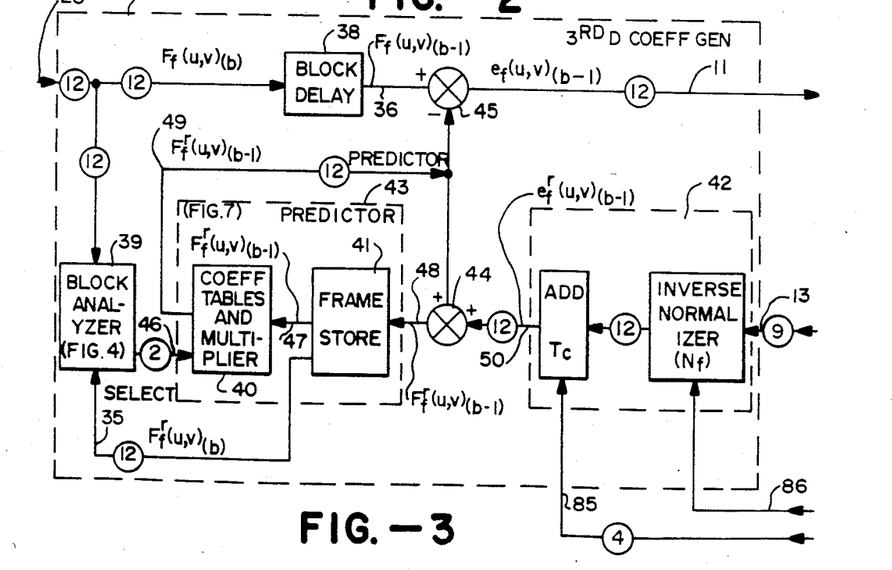
FIG. 3 depicts a schematic block diagram of the $3^{rd}$ dimension ($3^{rd}$D) coefficient generator utilized in the 3D transform processor of FIG. 2.

$3^{rd}D$ Coefficient Generator—FIG. 3

In FIG. 3, the cosine transform coefficients for the $f^{th}$ frame and the $b^{th}$ block appear on bus 28 with the values $F_f(c)_b$ where c has values 0,1,2, ..., 255. These coefficients are stored in the block delay 38 for one block cycle and provide the one block delayed output on bus 36 as $F_f(c)$ $_{(b-1)}$. The coefficients on bus 36 form one input to the subtractor 45. Subtractor 45 receives, from bus 49, the predicted value of coefficients, $F_f^p(c)$ $_{(b-1)}$. The difference between the predicted value on bus 49 and the actual value on bus 36 forms the difference signal, $e_f(c)$ $_{(b-1)}$ on output bus 11. The difference signal on bus 11 represents the 3D coefficients with correlation reduced from frame to frame. The correlation is from frame to frame because the predicted value on bus 49 is predicted as a function of the previous frame coefficients $F_{(f-1)}{}^r(c)$ $_{(b-1)}$ which appear on bus 47 from the frame store 41. The superscript "r" signifies that the coefficients have been reconstructed from the transmitted difference signals. The difference signals for coding are fed back on bus 13 to the inverse normalizing and threshold adding unit 42. When processed by unit 42, the reconstituted difference signal $e_f{}^r(c)$ $_{(b-1)}$ is formed on bus 50 and is added to the predicted coefficients on bus 49 to form the reconstituted coefficients $F_f{}^r(c)$ $_{(b-1)}$ on bus 48. The reconstituted coefficients on bus 48 are stored for a frame delay time in frame store 41 so as to provide the previous frames reconstituted coefficients $F_{(f-1)}{}^r(c)$ $_{(b-1)}$ on bus 47. Frame store 41 also stores the previous frames coefficient for the preceding block, b, and provides the reconstituted previous block's coefficients, $F_{(f-1)}{}^r(c)_b$ on bus 35 to the block analyzer 39.

In FIG. 3, the block analyzer 39 compares the cosine transform coefficients for the $f^{th}$ block and $f^{th}$ frame with the reconstituted cosine transform coefficients of the previous frame, the $(f-1)^{th}$ frame for the corresponding $b^{th}$ block. Based upon the magnitude of the difference signal indicating the block-to-block difference between the present frame block coefficients and the previous frame block coefficients, block analyzer 39 provides an output on bus 46 indicating a selection of one of a number of coefficient tables within unit 40. Each table stores a different set of prediction factors. If the difference is large, then the coefficients from the unit 40 will be all zeros indicating that nothing is subtracted in subtractor 45 from the cosine transform coefficients supplied by block delay 38. Under this condition, the actual coefficients from block delay 38 without modification appear on the bus 11. If on the other hand, the error signal is small, then the coefficients from one of the tables in unit 40 have a greater magnitude. In general, the outputs from the coefficient tables in unit 40 are nonlinear. Further details concerning the nature of the tables stored in unit 40 are described in connection with FIGS. 7 and 8.

Figure 4:
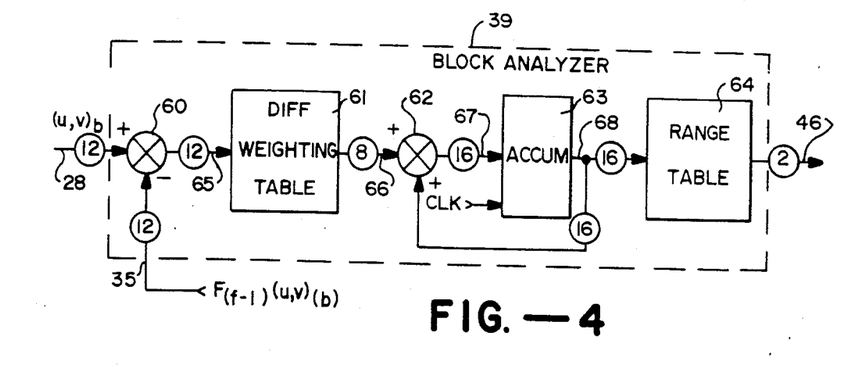
FIG. 4 depicts a schematic block diagram of the block analyzer utilized in the $3^{rd}$D coefficient generator of FIG. 3.

The manner in which the block analyzer 39 compares the $f^{th}$ frame block with the $(f-1)^{th}$ frame block is described further in connection with FIG. 4.

Block Analyzer—FIG. 4

In FIG. 4, block analyzer 39 of FIG. 3 is shown in further detail. The block analyzer receives one at a time the $f^{th}$ frame 12-bit coefficients, $F_f(c)_b$, for the $b^{th}$ block on input bus 28 and subtracts from each one the $(f-1)^{th}$ frame reconstituted coefficient, $F_{(f-1)}(c)_b$, on bus 35 to provide a 12-bit difference signal on bus 65. The signal on bus 65 addresses table 61 to provide on bus 66 a nonlinear 8-bit weighting factor which is a function of the difference signal on bus 65. The weighting factor from table 61 on bus 66 is added to the accumulated block weighting factor which is stored in accumulator 63. Accumulator 63 has the accumulated weighting factors for all prior coefficients (c=0, 1, 2, ..., 255) within the same block, b. The accumulated output from accumulator 63 addresses a table 64 to specify one of several different sets of prediction factors.

Figure 5:
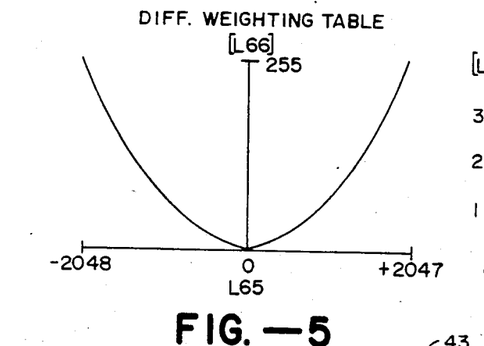
FIG. 5 depicts the contents of the table which is utilized in the block analyzer of FIG. 4.

FIG. 5 depicts typical data stored in table 61. The bus 65 [L65] signal includes 11 data bits which address table 61 and a $12^{th}$ sign bit. The sign bit is ignored.

Figure 6:
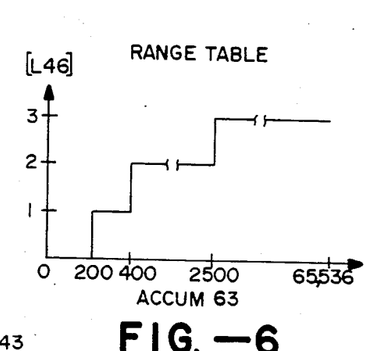
FIG. 6 depicts the contents of the range table utilized within the block analyzer of FIG. 4.

FIG. 6 depicts the data stored in table 64.

Typically the output from table 64 is a 2-bit signal which indicates one of four prediction factor tables in the unit 40 of FIG. 4.

Each one of the 256 coefficient differences for c=0, 1, 2, ..., 255 provides an input to the adder 62 from table 61. Adder 62 adds the value from table 61 with the accumulated value in accumulator 63. Accumulator 63 can accumulate up to a value of $2^{16}$, which is equal to 65,536. The 16-bit value on bus 68 produces, in one example, one of four outputs from the range table 64. If the accumulated value in accumulator 63 is less than 50, then the output is 0. If the accumulated output is between 50 and 100, the output is 1. If the output is between 100 and 200, the output from table 64 is 2. If the accumulated value and accumulator 63 is greater than 200, then the output from table 64 is 3. The four different values, 0, 1, 2, or 3 output from table 64 are encoded on the 2-bit bus 46 to specify one of four sets of prediction factors in tables T0, T1, T2, and T3, respectively in the unit 40 of FIG. 3. Further details of the tables and the predictor unit 43 of FIG. 3 are shown in FIG. 7.

Figure 7:
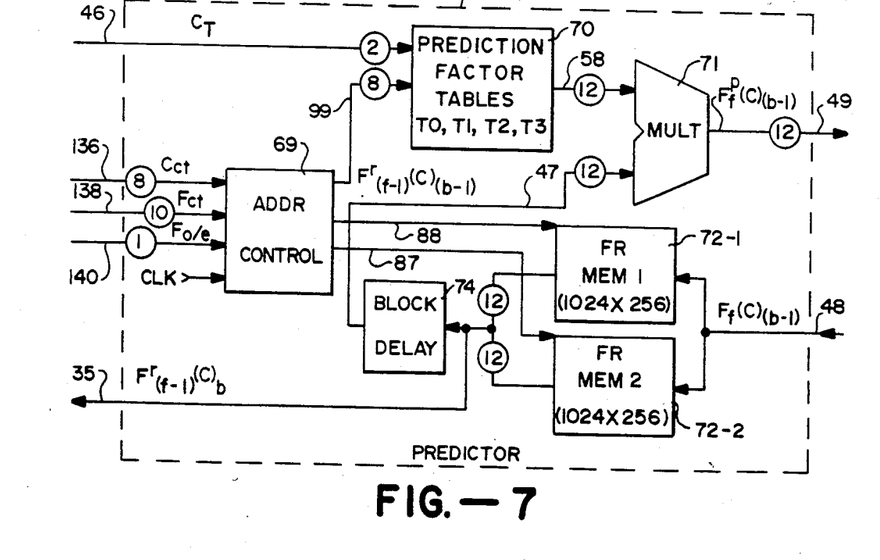
FIG. 7 depicts the pedictor which forms part of the $3^{rd}$D coefficient generator of FIG. 3.

Predictor Unit—FIG. 7

In FIG. 7, the memory 70 stores the four tables T0, T1, T2, and T3. The particular one of the four tables selected is determined by the block analyzer of FIG. 4 by the 2-bit signal on bus 46. Each one of the tables in memory 70 stores up to 256 different 12-bit values, one for each of the coefficients in a block. The values from the tables are addressed one at a time by the 8-bit address on bus 99 to provide the 12-bit output on bus 58. The values in the tables of the coefficient memory 70 have a magnitude between 0 and 1. These values determine the leakage factor, K, for each value of the reconstituted coefficient $F_{(f-1)}{'}(c)_{(b-1)}$ for c equal to 0,1, .. ., 255. The leakage factor for each value of c, is accessed from the memory 70 and appears on bus 58 to be multiplied by the corresponding reconstituted coefficient value on bus 47. Multiplier 71 multiplies the coefficient value times the leakage factor to produce the predicted value of the transform coefficient, $F_f{p}(c)_{(b-1)}$, on the 12-bit bus 49.

The predicted value of the transform coefficient on bus 49 is the one connected to the subtractor 45 and the adder 44 in the coefficient generator of FIG. 3.

In FIG. 7, the reconstituted transform coefficient $F_f{'}(c)_{(b-1)}$ formed from the adder 44 in FIG. 3 is stored in one of the memories 72-1 or 72-2 each CLK cycle. The reconstituted transform coefficient is connected for storage either in the first frame memory, 72-1, or the second frame memory 72-2. Memories 72-1 and 72-2 are each logically organized into 1024 by 256 locations where each location stores a 12-bit word from bus 48. At any one time, one of the memories 72-1 or 72-2 is storing information from bus 48 while the other of the memories, 72-1 or 72-2 is being read out to provide the transform coefficient to the block delay memory 74.

Because of the delays inherent in the processing loop of FIG. 3, the addressing of the coefficient memory 70, and the frame memories 72-1 and 72-2 are skewed in order that the correct transform coefficient values appear in the correct time sequence. The addressing of each of these memories is under control the address control 69 which forms a part of the transmitter control 1. The basic timing and addressing is determined by the data rate of input data on the bus 12 to the transmitter of FIG. 1. If the input data rate is the clock rate, CLK, then a new address for each transform coefficient is generated each CLK period. One convenient way of generating the addresses for the coefficients is to step a coefficient counter with the CLK signal as shown, for example, in FIG. 12.

Figure 12:
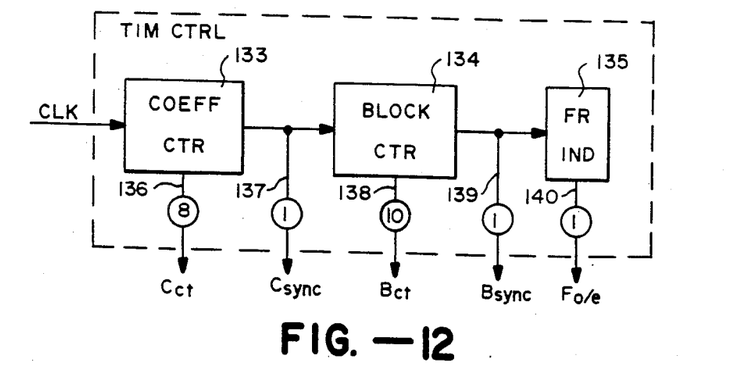
FIG. 12 depicts the timing control which forms part of the transmitter control within the transmitter of the FIG. 1 system.

In FIG. 12, the coefficient counter 133 is an 8-bit counter which provides the coefficient count $C_{ct}$ on the 8-bit address bus 136. The carryout from the coefficient counter 133 is the coefficient sync pulse, $C_{sync}$ on bus 137. The carryout from counter 133 clocks a 10-bit block counter which provides a 10-bit block address, $B_{ct}$, on the bus 138. The carryout from the block counter is the block sync pulse, $B_{sync}$, on the bus 139. The carryout from counter 134 clocks a 1-bit counter 135 which is an odd and even frame indicator, providing the 1-bit output on bus 140. The address control 69 of FIG. 7 receives the output buses and lines 136 through 140 for controlling the address generation for the memory 70 and 72-1 and 72-2.

In FIG. 3, the coefficient count, $C_{ct}$ addresses the 256-by-12 word memory of the block delay 38 to store the transform coefficient $F_f(c)_b$ for all 256 values of the $b^{th}$ block. Accordingly, the ouptut from the block delay 38 is the $(b-1)^{th}$ block. Also, the output from the predictor 43 is for the $(b-1)^{th}$ block.

In FIG. 3, the block analyzer 39 does the analysis on the $b^{th}$ block so that the output from the predictor 43 is also for the $b^{th}$ block, but for the $(f-1)^{th}$ frame. Accordingly, the block analyzer 39 does an analysis on the $b^{th}$ block for the $f^{th}$ and the $(f-1)^{th}$ frames. In order that the correct block information is read into and accessed from and to the memories of FIG. 7, the address control 69 generates the required addresses.

The information stored in memory 72-1 and the memory 72-2 is offset as a function of the number of delays in the FIG. 3 processing loop. Of course, the offset can be any number of cycles. In the particular example shown, there is a one-block offset. When memory 72-1 is reading information, then generally memory 72-2 is a writing information. In one period, all of the 256 12-bit coefficients for each of 1,024 blocks are stored into memory 72-1. After being stored in memory 72-1 for one frame, the next frame of coefficients is stored in the memory 72-2. While the coefficients for the second frame are being stored in memory 72-2, the coefficients from the previous frame are read from the memory 72-1 to form the $(f-1)^{th}$ frame coefficients $F_{(f-1)}{'}(c)_b$. Because the block addresses are skewed by one block address count, the system must read the memory address for the $b^{th}$ count one block cycle earlier than the writing of the $(b-1)^{th}$ block count. This offset in the block addressing is controlled by the address control 69. Of course, if more than one block address count delay is encountered in the FIG. 3 loop, then a greater offset between the block memory addresses must be employed.

Figure 8:
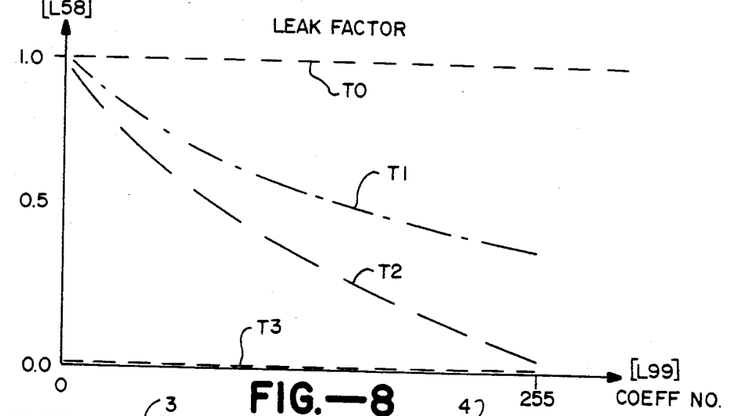
FIG. 8 depicts the contents of the coefficient tables which form part of the predictor of FIG. 7.

In FIG. 7, the block delay 74 is a 256-by-12 memory storing 12-bit words and delays each block read from memory 72-1 or 72-2 by one block delay. Accordingly, the $b^{th}$ block appears on bus 35 when the $(b-1)^{th}$ block appears on bus 47. In FIG. 8, further details of the prediction factor tables T0, T1, T2 and T3 within the coefficient memory 7 of FIG. 7 are shown. When the output from the range table of FIG. 6 is a 0, the T0 prediction factor is 1.0 meaning that the predicted value of the coefficient $F_f{p}(c)_{(b-1)}$ is the same as the reconstituted value of the transform coefficient, $F_{(f-1)}{'}(c)_{(b-1)}$. When the output from range table 64 is a 1, the T1 prediction factor of FIG. 8 is selected. The prediction factor of table T1 has a nonlinear value which starts at 1.0 and decays to approximately 0.5 as a function of the coefficient number, represented by the coefficient count $C_{ct}$, which ranges between 0 and 255 for each block.

When the table T2 is selected, the prediction factor ranges in nonlinear way from 1.0 down to close to 0. When the table T3 is selected the prediction factor is 0 indicating that the predicted coefficients are all 0.

The different sets of prediction factors of FIG. 8 represent the statistically predicted properties of cosine transform coefficients as a function of frame-to-frame transform coefficient comparisons performed by block analyzer 39.

Figure 9:
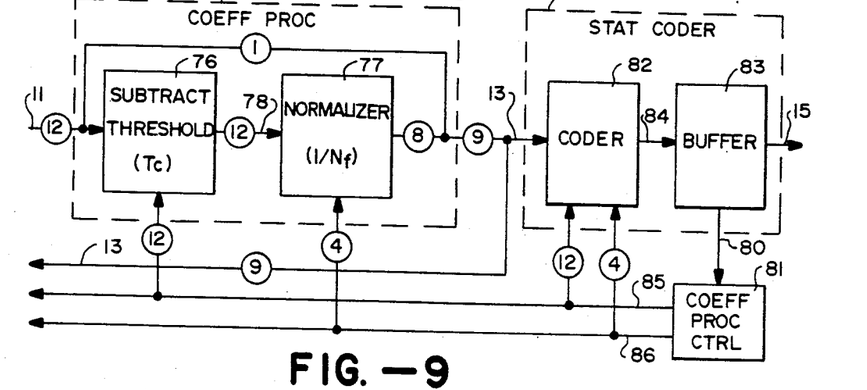
FIG. 9 depicts a schematic block diagram of the coefficient processor and the statistical coder which are part of the transmitter of the FIG. 1 system.

Coefficient Processor—FIG. 9

In FIG. 9, the coefficient processor 3 within the transmitter 24 of FIG. 1 is shown in further detail. The difference signal, $e_f(u,v)$ $_{(b-1)}$ which is equal to $e_f(c)$ $_{(b-1)}$ is input on the 12-bit bus 11. A threshold value, $T_c$, is subtracted from the difference signal on bus 11 and that difference is output on 12-bit bus 78. The sign bit of bus 11 bypasses units 76 and 77 and is reconnected to bus 13. In one embodiment, $T_c$ is a constant number, for example, 1.5. The difference signal on bus 78 after subtracting the threshold value in subtractor 76 is normalized by a normalization factor $1/N_f$. The normalizer 77 is a multiplier which multiplies $[e_f(c)$ $_{(b-1)} - T_c]$ by the factor $1/N_f$. In a typical example, $N_f$ ranges between 4 and 16 and is dynamically specified by the coefficient processor control 81 on the 4-bit bus 86. Since the input on bus 78 ranges from $-2048$ to $+2047$, the normalized output on bus 13 will range from 0 to 128 for $N_f$ equal to 16 to a range of 0 to 512 when $N_f$ is equal to 4. The magnitude of $N_f$ is dynamically varied by the processor control 81 to control the rate at which data is generated in the statistical coder 4 of FIG. 9. In an alternated embodiment, the threshold $T_c$ is dynamically controlled by the processor control 81 and appears on the 12-bit bus 85. When the value of $T_c$ is dynamically controlled, the rate at which data is generated in the statistical coder 4 will vary also.

Figure 10:
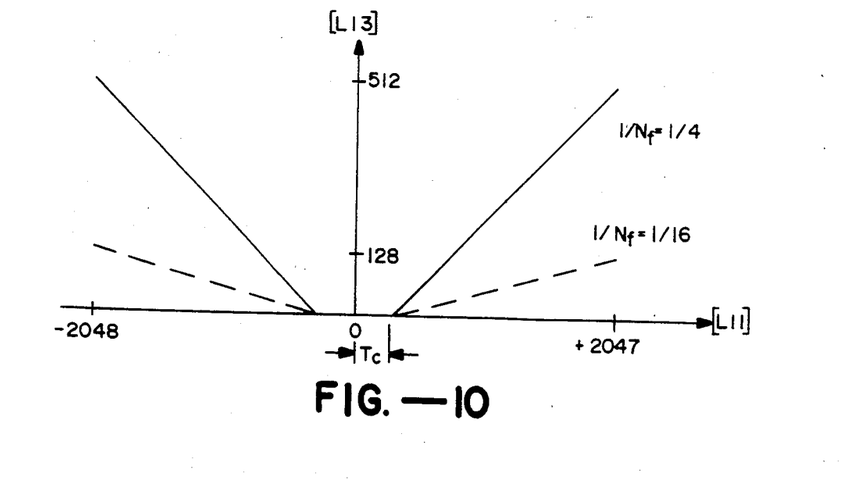
FIG. 10 depicts the operation of the coefficient processor shown within FIG. 9.

The operation of the coefficient processor of FIG. 9 is represented by the graph of FIG. 10. The range of input numbers on the 12-bit bus 11 is represented by the horizontal axis labeled [L11]. The controlled range of output numbers on 9-bit bus 13 is indicated by the vertical axis labeled [L13].

In FIG. 9, the coefficient processor 3 functions to reduce the input data range from $-2048$ to $+2047$ to a variable output range which can be as large as 0 to 512 and as small as 0 to 128. This range is dynamically controlled in accordance with the operation of the statistical coder 4 of FIGS. 1, 9 and 11.

Figure 11:
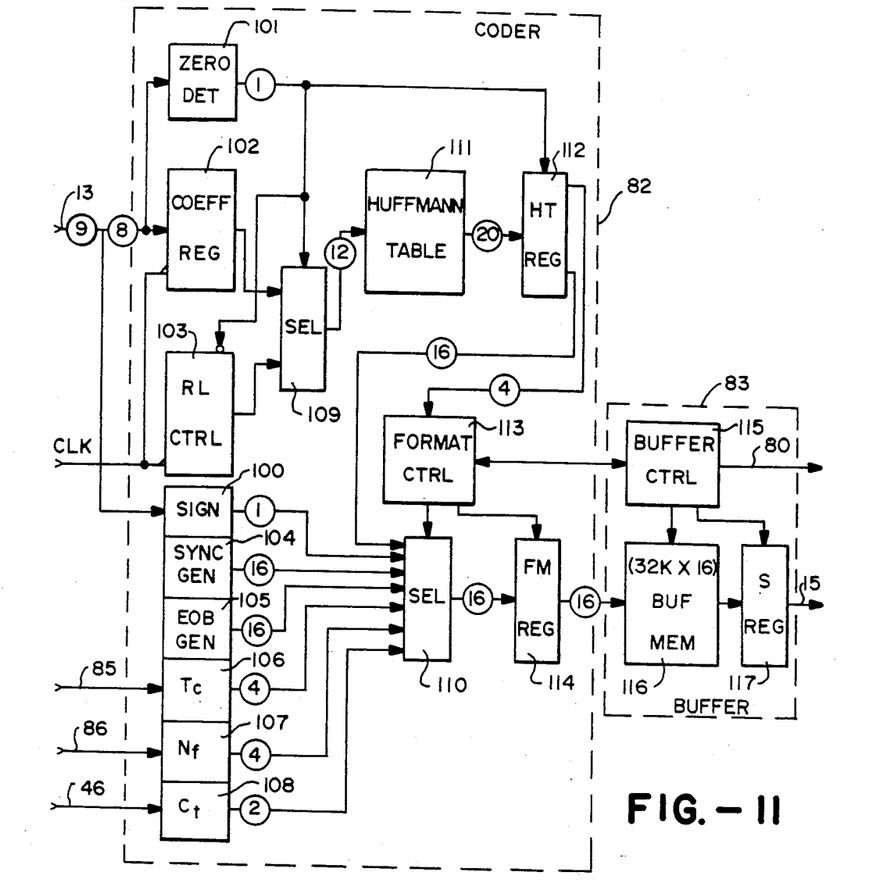
FIG. 11 depicts the statistical coder shown in FIG. 9 and which is part of the transmitter within the FIG. 1 system.

Statistical Coder—FIG. 11

In FIG. 11, the statistical coder 4 includes a coder 82 and a transmitter buffer 83. The coder receives the output bus 13 from the coefficient processor and stores the output value of the coefficient difference in the coefficient register 102. A zero detector circuit 101 senses whenever the level of the signal on bus 13 is zero to control the selector 109. Selector 109 selects between the contents of the coefficient register 102 and the run length counter 103. Counter 103 is incremented each time a zero is stored into register 102. The run length counter 103 is selected by the selector 109 whenever zero detector 101 detects a 0.

Whenever zero detector 101 detects a non-zero condition, selector 109 selects the non-zero value from coefficient register 102 and resets the run length counter 103. The selected value from register 102 or from the counter 103 is input to the Huffman table 111. Table 111 provides a 20-bit output to the Huffman table register 112. The 20-bit output from table 111 has a 4-bit field which designates the number of bits in the code, between 0 and 16, and a code which is from 0 to 16 bits long. The 4-bit code length is input to a format control 113 and the 0-to-16-bit code is input to a selector 110. Huffman table 111 only has its output latched into the register 112 when the zero detector 101 signifies that a non-zero output has been latched into register 102. Accordingly, the highest count from the run length counter 103 or numbers from register 102 cause data to be latched into register 112. The use of run length encoding to recognize long strings of zeros significantly reduces the data output from table 111. While a coefficient difference value appears on bus 13 each CLK cycle, an output from register 112 only occurs in response to non-zero values of data on bus 13.

The operation of the coefficient processor 3 of FIG. 9, however, converted many of the small difference values, that is, those less than the threshold $T_c$, to zero values. Further, the normalization by $N_f$ reduces the amplitude of coefficient differences in register 102 further reducing the length of the codes from table 111. Therefore, the combined operation of the coefficient processor 3 and the statistical coder 4 significantly reduces the amount of data which is output through register 112.

Selector 110, under control of the 16-bit format control 113 packs the data into 16-bit lengths into the format register 114. In addition to the encoded data from the register 112, selector 110 selects a number of other data fields to be transmitted to the receiver. The data fields typically include a 16-bit synchronization code (SYNC) from a sync generator 104, an end of block code (EOB) from the end of block generator 105, the threshold value, $T_c$, in register 106 received from the coefficient processor control 81 of FIG. 9, the normalization factor $N_f$ stored in register 107 from the coefficient processor control 81 of FIG. 9 and the coefficient table number, $C_T$, in register 108 from the 2-bit bus 46 from the block analyzer of FIG. 4. Transmission data has the format of the following TABLE II and TABLE III.

TABLE II

| Sync (16) | Hdr (4) | NF (4) | B0 | B1 | B2 | ... | B(X-1) | Sync (16) |
|---|---|---|---|---|---|---|---|---|

TABLE III

| Bx: [Block x, x = 0,1, ... ,(X-1)] where X typically = 1024 |
|---|
| $C_T$ A0 A1 A2 A3 R0 A4 R1 A5 R2 ... Rm An EOB (2) |

$C_T$ = Prediction factor table
A0 = DC value for Intraframe only
Ai = Amplitude code, i = 0,n
Rj = Run length code, j = 0,m
EOB = End of Block code Format control 113, packs the data in the format of TABLE II and TABLE III into the format register 114. Whenever the format register 114 is full, the data is transferred to the transmitter buffer memory 116. In one typical example, the buffer memory 116 includes 32K 16-bit words. Buffer 116 is filled under control of the buffer control 115 at the asynchronous rate at which data is generated. Buffer memory 116 is emptied 16 bits at a time into the parallel serial register 117 at 1/16th the synchronous data rate on the bit-serial transmission bus 15 output. The fullness of the buffer memory 116 is determined by the buffer control 115 in any conventional manner and provides the buffer fullness indication on the output bus 80. One method of generating the buffer fullness signal is described in U.S. Pat. No. 4,302,775. The buffer fullness signal on bus 80 is input to the coefficient processor control 81 of FIG. 9 to alter the normalization factor, $N_f$, and/or the coefficient threshold, $T_c$. Altering of these factors directly affects the rate at which data is output from the Huffman table register 112 of FIG. 11.

Figure 13:
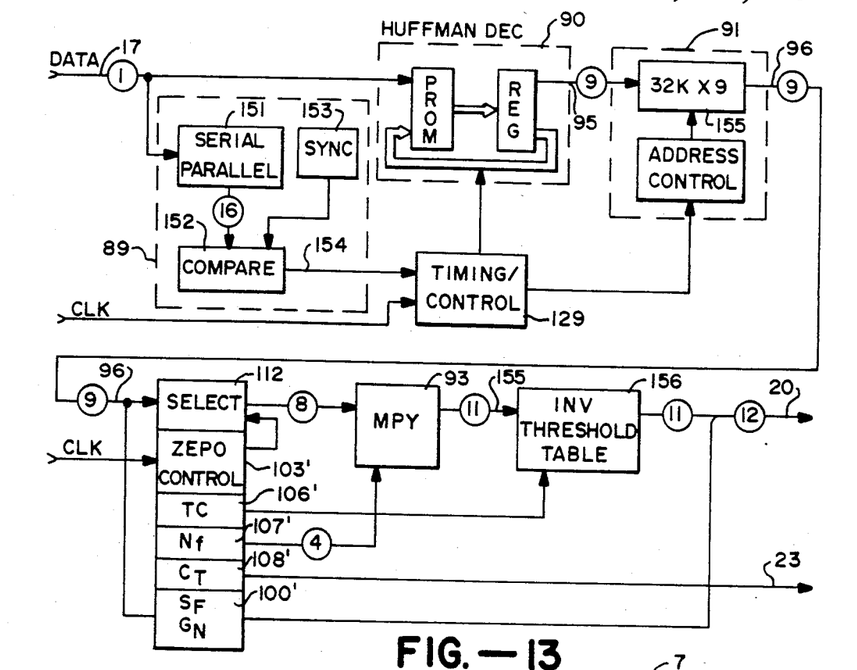
FIG. 13 depicts a schematic block diagram of the decoder utilized in the receiver of the FIG. 1 system.

In FIG. 13, the decoder 6 within the receiver 25 of FIG. 1 is shown in further detail. The decoder includes a sync detector 89 which detects the synchronization pattern within each frame of data transmitted by the transmitter. The detected sync signal enables the Huffman decoder 90 to decode the Huffman data and store it into the buffer 91. The data from the buffer 91 is inverse normalized in inverse normalizer 93 and inverse thresholded in unit 156.

The sync detector 89 includes a serial/parallel register 151 which synchronously stores each bit on the 1-bit input line 17. Register 151 provides a 16-bit output as one input to the comparator 152. The other input to comparator 152 is from the sync register 153. Register 153 stores the same 16-bit synchronization code provided by the sync generator 104 of FIG. 11. Whenever the comparator 152 detects that the pattern stored in the register 151 is the same as the sync code from register 153, the sync signal output on line 154 is asserted. The sync signal on line 154, together with the CLK input, synchronizes the timing in the timing control 129. Timing control 129 includes a counter chain, like that of FIG. 12, and other conventional controls for controlling the unpacking of data in the receiver.

The Huffman decoder 90 is a bit-serial decoder which receives the one-bit input data from the transmission line 17 and unpacks the data from the format previously described in connection with the formats of TABLE III.

The unpacked data is stored in the buffer memory 91. Buffer memory 91 is typically 32K by 9 bits and is addressed to store information output from the Huffman decoder 90. The unpacked information from the buffer 91 is output over the 9-bit bus 96 and is input to various registers. The sign bit is stored in the register 100', the prediction table number, $C_T$ is stored in the register 108'. The normalization factor, $N_f$, is stored in the register 107'. The coefficient threshold, $T_c$, is stored in the register 106'. The zero counter 103' stores the run-length count. The register 112' stores the 8-bit transform coefficient differences. The output from the register 112 is zero whenever a non-zero count is stored in the zero counter register 103'. Counter 103' is decremented each CLK time. Whenever the zero counter 103' has been decremented to 0, then the coefficient from register 112' is gated as an input to the multiplier 93.

Multiplier 93 multiplies the coefficient by the inverse normalization factor, $N_f$, to provide the 11-bit output on bus 155. The inverse threshold table 156 adds the threshold, $T_c$, to all non-zero values on bus 155 to provide the inverse processed signals on the 11-bit output from table 156. The sign bit from register 100' is combined with the 11-bit output from table 156 to form the signed signal on 12-bit bus 20 which represents the received coefficient difference signals.

Figure 14:
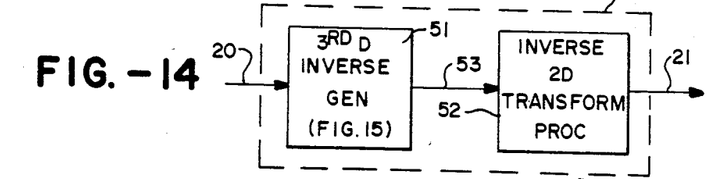
FIG. 14 depicts a block diagram of the inverse three-dimensional (3D) processor utilized in the receiver of the FIG. 1 system.
Figure 15:
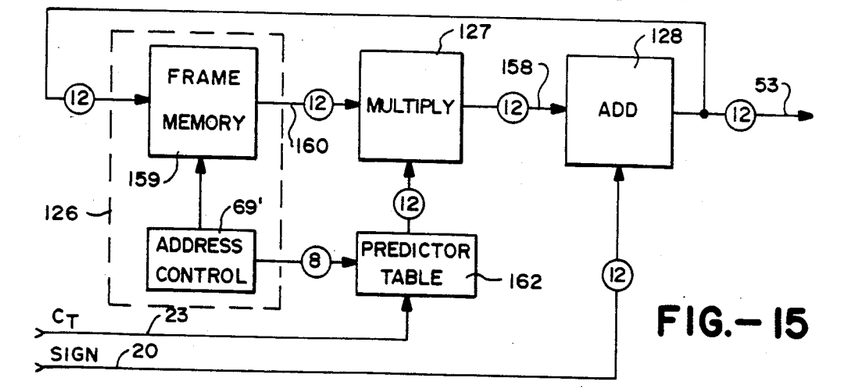
FIG. 15 depicts a schematic block diagram of the 3rdD inverse generator which forms a part of the inverse 3D processor of FIG. 3.

In FIG. 15, the $3^{rd}$D inverse coefficient generator 51 of FIG. 14 is shown in further detail. The 12-bit difference signals on bus 20 provides one input to the adder 128. The other input to adder 128 is the reconstructed predicted value of the transform coefficient on bus 158. The value on 158 is derived by storing the output value from adder 128 into a frame memory 159. The value from the frame memory 159 is delayed one frame cycle to provide the 12-bit $(f-1)^{th}$ value on bus 160. The $(f-1)^{th}$ value on bus 160 is multiplied by a prediction factor from the predictor table 162. The predictor table 162 is like the predictor table 70 of FIG. 7 and is addressed in the same way under control of the address control 69'. The address control 69' is analogous to the address control 69 in the predictor 43 of FIG. 7.

The output on bus 53 is the recovered value of the transform domain coefficients. The recovered value on bus 53 is input into the inverse 2D transform processor 52 of FIG. 14 and produces the recovered digital image signals on output bus 21.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A method for processing image signals to reduce the amount of data utilized to represent images where the images are defined by a sequence of frames where each frame includes a two-dimensional array of digital signals representing the image, the steps comprising,
    transforming the digital signals to form transform coefficients for each of a plurality of frames in the sequence of frames,
    forming predicted transform coefficients for a first frame using variable prediction factors,
    comparing said predicted transform coefficients with corresponding transform coefficients of a second frame to provide transform coefficient difference signals for each of the coefficients of said second frame,
    processing said transform difference signals to form processed difference signals having a controlled range of values,
    coding said processed difference signals to form statistically coded signals such that the more frequently occurring values of coded signals are represented by shorter code lengths and the less frequently occurring values of coded signals are represented by longer code lengths.

2. The method of claim 1 wherein said variable prediction factors are determined as a function of frame-to-frame differences in said images.

3. The method of claim 2 wherein said variable prediction factors are determined in response to frame-to-frame comparisons of said transform coefficients.

4. The method of claim 2 wherein said variable prediction factors are determined as a function of frame-to-frame comparisons of said digital signals.

5. A method for processing image signals to reduce the amount of data utilized to represent images where the images are defined by a sequence of frames where each frame includes a two-dimensional array of blocks where each block includes a two-dimensional array of digital signals representing the portion of an image within the block, the steps comprising,
    transforming the digital signals to transform coefficients for each block for each of a plurality frames in the sequence of frames,
    forming variable predicted transform coefficients for each block of a first frame using variable prediction factors determined for each block,
    comparing said predicted transform coefficients with corresponding transform coefficients of a corresponding block of a second frame to provide transform coefficient difference signals for each of the coefficients in each of the blocks of said second frame, processing said transform difference signals for each block to form processed difference signals having a controlled range of values, coding said processed difference signals to form statistically coded signals such that the more frequently occurring values of coded signals are represented by shorter code lengths and the less frequently occurring values of coded signals are represented by longer code lengths, storing said coded signals in a buffer memory.

6. The method of claim 5 wherein the step of forming predicted transform coefficients includes, for each block, comparing data elements in a block of said first frame with data elements of a corresponding block in said second frame to form a data comparison signal, weighting said comparison signal to form a weighted comparison signal, accumulating said weighted comparison signal for each of the data elements in the block to form an accumulated count for the block, selecting a set of said prediction factors for the block as a function of said accumulated count.

7. The method of claim 6 wherein said data elements are transform coefficients.

8. The method of claim 6 wherein said data elements are said digital signals.

9. The method of claim 5 wherein the step of forming predicted transform coefficients includes, for each block, comparing each transform coefficient in a block of said first frame with a corresponding transform coefficient of a corresponding block in said second frame to form a coefficient comparison signal, weighting said comparison signal to form a weighted comparison signal, accumulating said weighted comparison signal for each of the coefficients in the block to form an accumulated count for the block, selecting a set of said prediction factors for the block as a function of said accumulated count.

10. The method of claim 9 wherein said set of prediction factors is unity whenever the accumulated count is below a first accumulated count value and wherein said set of prediction factors is zero whenever said accumulated count exceeds a second accumulated count value.

11. The method of claim 10 wherein said set of prediction factors is bounded by unity and zero and wherein said factors vary for each transform coefficient difference in the block whenever said accumulated count is between said first and second accumulated count values.

12. The method of claim 11 wherein said factors vary non-linearly such that the factor is greater for coefficient differences corresponding to low frequencies and lower for coefficient differences corresponding to high frequencies.

13. The method of claim 9 wherein said set of prediction factors is unity whenever the accumulated count is below a first accumulated count value.

14. The method of claim 9 including loading a replenishment signal into said buffer memory in place of said coded signals whenever said accumulated count is below a first accumulated count value to signify that the coefficients for the block of the second frame are to be interpreted as the same as the coefficients for the block of the first frame.

15. The method of claim 5 wherein the step of storing said coded signals in a buffer memory increases the fullness of said buffer memory and further including the steps of, unloading said coded signals from said buffer memory for transmission thereby reducing the fullness of said buffer memory, and adaptively controlling the processing of said transform difference signals as a function of the fullness of said buffer memory to control the range of values of said processed difference signals whereby the amount of data representing the images in said coded signals is adaptively controlled.

16. The method of claim 15 wherein said processing step includes a normalization step whereby each of said difference signals is multiplied by a normalization factor $1/N_f$ to form a normalized processed difference signal and wherein said step of adaptively controlling varies $N_f$ as a function of the fullness of said buffer.

17. The method of claim 16 wherein said processing step includes the step of reducing any normalized processed difference signal having a value less than a threshold, $T_c$, to zero value to form said processed difference signals and wherein said coding step includes a run-length coding step representing sequential ones of said processed difference signals with zero value in run-length code.

18. The method of claim 17 wherein said coding step includes a statistical coding step for coding said run-length code and said processed difference signals.

19. The method of claim 16 wherein the step of forming predicted transform coefficients includes, for each block, the steps of, comparing each transform coefficient in a block of said first frame with a transform coefficient of a corresponding block in said second frame to form a coefficient difference signal, accumulating said coefficient difference signals for each of the coefficients in the block to form an accumulated count for the block, selecting a prediction factor as a function of said accumulated count, multiplying said processed difference signals by the factor $N_f$ to form a reconstituted difference signal and adding said reconstituted difference signal to said predicted transform coefficients to form reconstituted transform coefficients and multiplying said reconstituted transform coefficients by a prediction factor within said set to form a predicted transform coefficient for a subsequent frame.

20. The method of claim 16 wherein the step of forming predicted transform coefficients includes, for each block, the steps of, comparing each transform coefficient in a block of said first frame with a transform coefficient of a corresponding block in said second frame to form a coefficient difference signal, accumulating said coefficient difference signals for each of the coefficients in the block to form an accumulated count for the block, selecting a prediction factor as a function of said accumulated count, multiplying said processed difference signals by the factor $N_f$ and adding $T_c$ to non-zero values of said processed difference to form reconstituted difference signal and adding said reconstituted difference signal to said predicted transform coefficients, selecting a prediction factor as a function of said accumulated count, modifying representations of the transform coefficients for the block as a function of said prediction factor to form said predicted representations.

21. A method for processing image signals to reduce the amount of data utilized to represent images where the images are defined by a sequence of frames where each frame includes a two-dimensional array of blocks where each block includes a two-dimensional array of digital signals representing the portion of the image within the block, the steps comprising, transforming the digital signals to transform coefficients for each block for each of a plurality frames in the sequence of frames, forming predicted transform coefficients for each block of a first frame, comparing said predicted transform coefficients with corresponding transform coefficients of a corresponding block of a second frame to provide transform coefficient difference signals for each of the coefficients in each of the blocks of said second frame, processing said transform difference signals for each block to form processed difference signals having a controlled range of values, determined by a feedback signal said processing including selecting a subset of said difference signals for each block with a selection threshold controlled by a threshold signal, coding said processed difference signals to form statistically coded signals such that the more frequently occurring values of coded signals are represented by shorter code lengths and the less frequently occurring values of coded signals are represented by longer code lengths, storing said coded signals in a buffer memory, thereby increasing the fullness of said buffer memory up to the currently filled capacity which is equal to or less than the maximum capacity of said buffer memory, unloading said coded signals from said buffer memory, thereby reducing the currently filled capacity of said memory, adaptively determining said feedback signal as a function of the difference between the currently filled capacity and the maximum capacity of said buffer memory.

22. An apparatus for processing image signals to reduce the amount of data utilized to represent images where the images are defined by a sequence of frames where each frame includes a two-dimensional array of digital signals representing the image, said apparatus comprising, means for transforming the digital signals to form transform coefficients for each of a plurality of frames in the sequence of frames, means for forming predicted transform coefficients for a first frame using variable prediction factors, means for comparing said predicted transform coefficients with corresponding transform coefficients of a second frame to provide transform coefficient difference signals for each of the coefficients of said second frame, means for processing said transform difference signals to form processed difference signals having a controlled range of values, means for coding said processed difference signals to form statistically coded signals such that the more frequently occurring values of coded signals are represented by shorter code lengths and the less frequently occurring values of coded signals are represented by longer code lengths.

23. The apparatus of claim 22 including means for determining said variable prediction factors as a function of frame-to-frame differences in said images.

24. The apparatus of claim 23 including means for determining said variable prediction factors in response to frame-to-frame comparisons of said transform coefficients.

25. The apparatus of claim 23 including means for determining said variable prediction factors as a function of frame-to-frame comparisons of said digital signals.

26. A apparatus for processing image signals to reduce the amount of data utilized to represent images where the images are defined by a sequence of frames where each frame includes a two-dimensional array of blocks where each block includes a two-dimensional array of digital signals representing the portion of an image within the block, said apparatus comprising, means for transforming the digital signals to transform coefficients for each block for each of a plurality frames in the sequence of frames, means for forming variable predicted transform coefficients for each block of a first frame using variable prediction factors determined for each block, means for comparing said predicted transform coefficients with corresponding transform coefficients of a corresponding block of a second frame to provide transform coefficient difference signals for each of the coefficients in each of the blocks of said second frame, means for processing said transform difference signals for each block to form processed difference signals having a controlled range of values, means for coding said processed difference signals to form statistically coded signals such that the more frequently occurring values of coded signals are represented by shorter code lengths and the less frequently occurring values of coded signals are represented by longer code lengths, means for storing said coded signals in a buffer memory.

27. The apparatus of claim 26 wherein said means for forming predicted transform coefficients includes, for each block, means for comparing data elements in a block of said first frame with data elements of a corresponding block in said second frame to form a data comparison signal, means for weighting said comparison signal to form a weighted comparison signal, means for accumulating said weighted comparison signal for each of the data elements in the block to form an accumulated count for the block, means for selecting a set of said prediction factors for the block as a function of said accumulated count.

28. The apparatus of claim 27 wherein said data elements are transform coefficients.

29. The apparatus of claim 27 wherein said data elements are said digital signals.

30. The apparatus of claim 26 wherein said means for forming predicted transform coefficients includes,
   means for comparing each transform coefficient in a block of said first frame with a corresponding transform coefficient of a corresponding block in said second frame to form a coefficient comparison signal,
   means for weighting said comparison signal to form a weighted comparison signal,
   means for accumulating said weighted comparison signal for each of the coefficients in the block to form an accumulated count for the block,
   means for selecting a set of said prediction factors for the block as a function of said accumulated count.

31. The apparatus of claim 30 wherein said set of prediction factors is unity whenever the accumulated count is below a first accumulated count value and wherein said set of prediction factors is zero whenever said accumulated count exceeds a second accumulated count value.

32. The apparatus of claim 31 wherein said set of prediction factors is bounded by unity and zero and wherein said factors vary for each transform coefficient difference in the block whenever said accumulated count is between said first and second accumulated count values.

33. The apparatus of claim 32 wherein said factors vary non-linearly such that the factor is greater for coefficient differences corresponding to low frequencies and lower for coefficient differences corresponding to high frequencies.

34. The apparatus of claim 30 wherein said set of prediction factors is unity whenever the accumulated count is below a first accumulated count value.

35. The apparatus of claim 30 means for including loading a replenishment signal into said buffer memory in place of said coded signals whenever said accumulated count is below a first accumulated count value to signify that the coefficients for the block of the second frame are to be interpreted as the same as the coefficients for the block of the first frame.

36. The apparatus of claim 26 wherein said means for storing said coded signals in a buffer memory increases the fullness of said buffer memory and further includes,
   means for unloading said coded signals from said buffer memory for transmission thereby reducing the fullness of said buffer memory, and
   means for adaptively controlling the processing of said transform difference signals as a function of the fullness of said buffer memory to control the range of values of said processed difference signals whereby the amount of data representing the images in said coded signals is adaptively controlled.

37. The apparatus of claim 36 wherein said means for processing includes normalization means whereby each of said difference signals is multiplied by a normalization factor $1/N_f$ to form a normalized processed difference signal and wherein said means for adaptively controlling varies $N_f$ as a function of the fullness of said buffer.

38. The apparatus of claim 37 wherein said means for processing includes means for reducing any normalized processed difference signal having a value less than a threshold, $T_c$, to zero value to form said processed difference signals and wherein said means for coding includes a run-length coder representing sequential ones of said processed difference signals with zero value in run-length code.

39. The apparatus of claim 38 wherein said means for coding includes a statistical coder for coding said run-length code and said processed difference signals.

* * * * *